United States Patent [19]

Baker

[11] Patent Number: 4,644,134

[45] Date of Patent: Feb. 17, 1987

[54] ELECTRICALLY HEATED HOSE HAVING CORRUGATED PLASTIC COVER

[75] Inventor: Robert G. Baker, Buford, Ga.

[73] Assignee: Nordson Corporation, Amherst, Ohio

[21] Appl. No.: 779,883

[22] Filed: Sep. 25, 1985

[51] Int. Cl.[4] ........................ H05B 3/58; F16L 11/12; F16L 53/00; B67D 5/62

[52] U.S. Cl. .................................... 219/301; 137/341; 138/33; 138/110; 138/121; 174/47; 219/522; 219/547; 222/146.5

[58] Field of Search .................. 219/300, 301; 174/47; 138/33, 110, 121; 222/146.1, 146.5; 239/133, 135

[56] References Cited

U.S. PATENT DOCUMENTS

| | | | |
|---|---|---|---|
| Re. 20,704 | 4/1938 | Pieper | 219/301 X |
| 1,956,409 | 4/1934 | Benander . | |
| 2,143,960 | 1/1939 | Stalter et al. | 138/110 |
| 2,159,163 | 5/1939 | Jolliffe . | |
| 2,185,741 | 1/1940 | Sorg et al. | 138/110 X |
| 2,578,280 | 12/1951 | Barnard | 219/301 X |
| 2,748,804 | 6/1956 | Guarnaschelli | 138/110 X |
| 3,109,461 | 11/1963 | Wolff et al. | 138/110 X |
| 3,186,438 | 6/1965 | Holmgren | 138/121 |
| 3,330,303 | 7/1967 | Fochler | 138/121 X |
| 3,336,950 | 8/1967 | Fochler | 138/121 |
| 3,559,692 | 2/1971 | Mantelet | 138/121 |
| 3,572,393 | 3/1971 | Eisert | 138/121 |
| 3,593,751 | 7/1971 | Herling et al. | 138/121 |
| 3,716,733 | 12/1973 | Keith et al. | 138/121 X |
| 4,245,759 | 1/1981 | Baker et al. | 222/146.5 |
| 4,323,174 | 4/1982 | Wood | 219/301 X |
| 4,455,474 | 6/1984 | Jameson et al. | 219/301 |

FOREIGN PATENT DOCUMENTS

| | | | |
|---|---|---|---|
| 2142068 | 3/1973 | Fed. Rep. of Germany | 138/121 |

OTHER PUBLICATIONS

"Kellums Poly Tuff Non-Metallic Tubing Systems", Brochure PT 6-1-84, Kellums Div., Harvey Hubbell Inc., Stonington, Conn. 06378.

"Corrtube, Corrugated Plastic Tubing", Brochure CT-7-84, OEM Corporation, Aurora, Ohio 44202.

*Primary Examiner*—Anthony Bartis
*Attorney, Agent, or Firm*—Wood, Herron & Evans

[57] ABSTRACT

A flexible electrically heated hose of substantially uniform construction throughout its length for transmitting hot liquid material includes a flexible polymeric tube encased within a braided metal covering and having hydraulic fitting at its opposite ends. Multiple plies of heat and electrical insulative material are helically wrapped around the braided covering and a least one electrical heating line is helically wrapped and embedded within the multiple plies. A molded plastic cuff is secured to each end of the hose and an exterior ply of corrugated polymeric tubing is provided about the exterior of the hose to prevent kinking and breaking of the hose at each hose cuff caused by severe bending forces at that location. The exterior of the corrugated tubing has annular ribs separated by annular recesses into which annular ribs on the interior of each cuff extend to secure the cuffs to the corrugated tubing.

3 Claims, 1 Drawing Figure

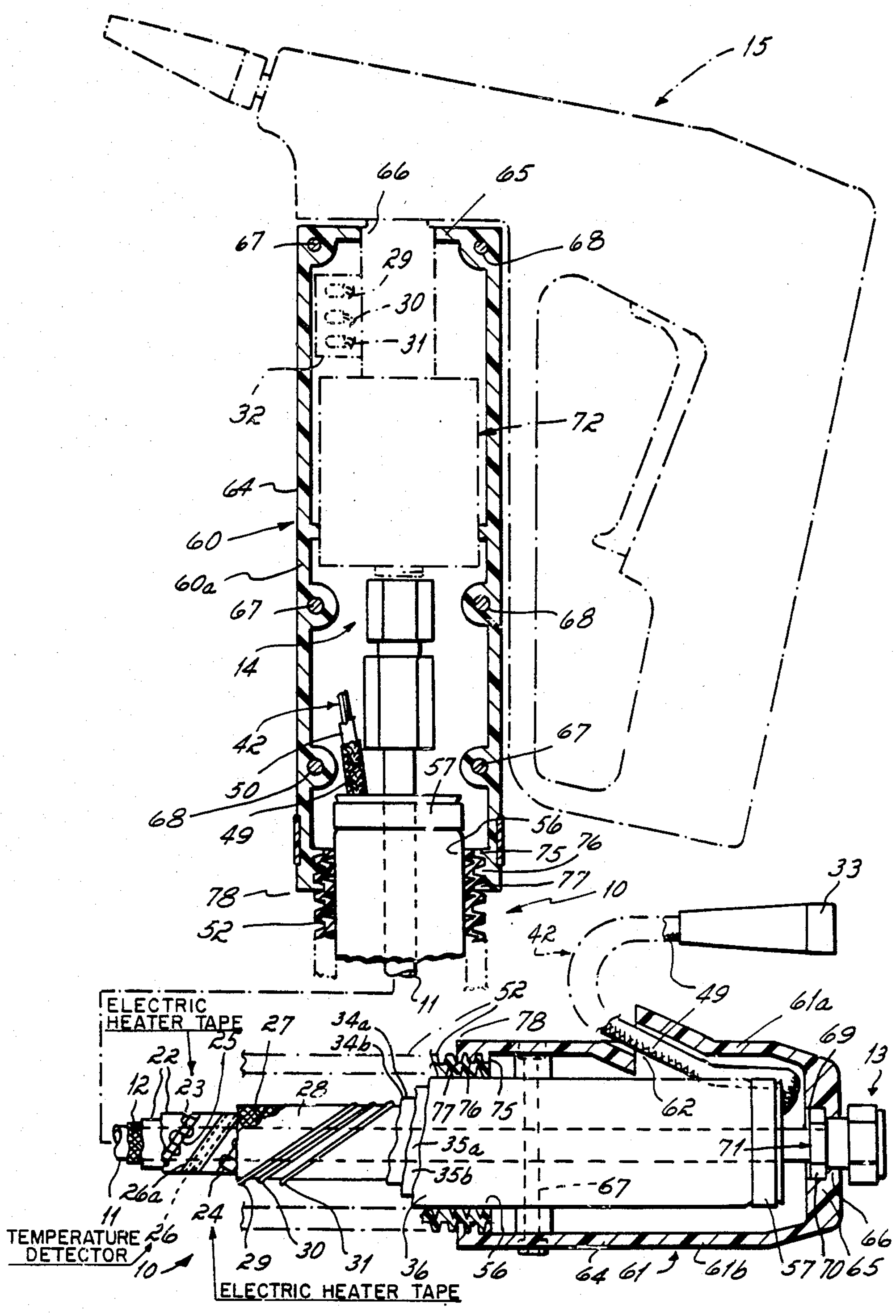
ELECTRIC HEATER TAPE
TEMPERATURE DETECTOR
ELECTRIC HEATER TAPE

ELECTRICALLY HEATED HOSE HAVING CORRUGATED PLASTIC COVER

This invention relates to heated hoses and more particularly to a heated hose for conveying molten thermoplastic material.

Thermoplastic material, or so-called "hot melt" materials, are generally solvent-free adhesives which are applied in a molten state and form a bond upon cooling to a solid state. By reason of their quick setting characteristics, their adhesive "tack," and their gap filling properties, they are used in many industrial adhesive applications. Many of these industrial applications utilize production line techniques wherein the adhesive applicator or gun must be moved by an operator to and around an assembly line during application of the adhesive to the substrate. In many such applications, the adhesive is supplied to the gun through a flexible hose. In this type of system, the molten feedstock or molten adhesive is converted from the solid state to a molten state by a melter structure such as a melting tank. The molten feedstock is then pumped from the melter structure to the gun or dispenser through a feed hose within which the molten feedstock is maintained at a temperature on the order of 350° F. and a pressure of several hundred pounds per square inch. That feed hose, as well as the dispenser gun or handgun to which the hose supplies the molten feedstock, are both commonly heated so as to maintain the feedstock in the molten state when the gun is not being used to dispense material or to remelt the feedstock if the gun is shut down for an extended period of time, i.e. overnight, between shifts, etc.

These feed hoses are handled and quite often come into contact with human operators who are handling the dispensing guns to which the hoses are attached. Therefore, the hoses are very well insulated so as to maintain the molten material on the inside of the hose at 350° F. and still be only warm to the touch on the outside of the hose. Generally, such hoses comprise a Teflon tube encased within stainless steel braiding. This braided tube has conventional hydraulic swivel fittings secured to its opposite ends. The braided tube is encased within a multiple-ply covering which includes electrical heating wires and a temperature sensor adhered between multiple plies of electrical and heat insulative materials. The multiple plies of electrical and heat insulative materials are then generally encased within a vinyl or plastic covering and a braided polyester cover. Plastic cuffs are generally attached to each end of the hose. Such a conventional prior art heated hose is disclosed in U.S. Pat. No. 4,455,474 of Calvin R. Jameson, et al, assigned to the assignee of this application.

In the past, heated hoses of the type described hereinabove have been subject to failure, either because of a breakage in the insulation or as a result of breakage of the electrical leads or electrical heating wires contained in the hose. Such breakage quite commonly occurs because of the hose being kinked during usage when subjected to severe bending forces. The hoses are designed with sufficient inherent rigidity to prevent kinking of the hose when subjected to any kind of anticipated bending forces, but such rigidity is generally not sufficient to prevent kinking and resultant hose breakage when subjected to severe bending stresses. The weakest point of the hose and the point at which the kinking and breakage usually occurrs is at the interface of the plastic hose cuff with the hose. At this point, an operator is able to apply sufficient leverage to the gun and hose cuff so as to crush the hose at the interface and thereby cause breakage of the hose. It has therefore been a primary objective of this invention to provide an improved heated hose which is not subject to being kinked and particularly is not subject to being kinked and broken at the intersection of the hose cuff with the hose. This objective is achieved and this invention is predicated upon the concept of enclosing the hose in corrugated plastic tubing and then securing the end of the tubing to the inside of the solid plastic cuffs at the ends of the hose. The rigid attachment of the corrugated plastic tubing to the inside of the plastic cuff has the effect of providing a controlled bend radii in the tube at the intersection of the hose and the cuff so as to prevent hose breakage at this point.

The heated hose of this invention which accomplishes this objective comprises a flexible polymeric tube, preferably of Teflon, contained within a braided metal covering and having hydraulic fittings sealingly secured to its opposite ends. This polymeric tube is helically wrapped with multiple plies of heat and electrically insulative material within which there is embedded at least one electrical heating line. A covering or exterior ply of polymeric corrugated tubing surrounds the hose with the ends of the tubing being secured within the interior of a plastic cuff at each end of the hose. The securement of the cuff to the corrugated tubing is effected by annular ribs on the interior of the cuff being engaged with annular recesses on the periphery of the corrugated tubing.

The primary advantage of the flexible heated hose of this invention over prior art flexible heated hoses is that it is less subject to breakage, particularly at the interface of the hose and the hard plastic cuff at the ends of the hose. Additionally, the provision of the corrugated plastic cover over the hose has the advantage of increasing the durability of the hose by protecting the hose against piercing by sharp objects. The corrugated cover also provides a moisture barrier for the protection of the hose, as well as preventing breakage of the electrical leads and wires contained internally of the hose.

These and other objects and advantages of this invention will be more readily apparent from the following description of the drawings in which: the drawing is a cross-sectional view of a flexible heated hose incorporating the invention of this application.

The hose 10 of this invention comprises a Teflon tube 11 over which there is applied a stainless steel wire braiding 12. Teflon is chosen for this application because it is one of the few polymeric materials which will withstand the relatively high temperatures at which molten thermoplastic adhesive is maintained as it is pumped from one place to another. However, Teflon will not withstand the relatively high pressures at which this material is usually pumped, i.e., on the order of 200 p.s.i., and therefore the Teflon tube is encased within the stainless steel metal braiding 12.

Extending from each end of the Teflon tube 11, there is a conventional hydraulic female swivel 13 and 14. One swivel 13 at one end of the hose is attached to a conventional hot melt adhesive melting unit (not shown) and the other swivel 14 is attached at the other end of the hose to a hot melt hand gun 15. The hand gun 15 is conventional and is the subject of U.S. Pat. No. 4,245,759. Accordingly, it has not been described in detail in this application.

The Teflon tube 11 is wrapped with the braiding 12 and then with a double-sided fiberglass electrical tape 22 which is helically wrapped in overlapping fashion for the length of the tube 11 and braiding 12. The tape 22 is referred to as double-sided because it has thermosetting adhesive on both sides. Consequently, it adheres to the braiding 21 of the tube and to a double wrap of heater tape 23, 24 which is helically wound over the fiberglass tape 22. The heater tapes 23, 24 are conventional, commercially purchasable items which include an electrical resistance heating wire 25, sinusoidally configured within the tape. Located between the two heater tapes 23, 24 at a midpoint in the length of the hose, there is a conventional resistance temperature detector RTD 26 helically wrapped about the hose over the double-sided fiberglass tape 22. The RTD is secured in place with a layer 26*a* of single-sided electrical tape. This temperature detector 26 is helically wound about the hose.

Atop the heater tapes 23, 24 and the temperature detector RTD 26, the tube is wrapped with a single-sided fiberglass electrical tape 27, which is helically wrapped in an overlapping fashion for the length of the tube 11.

Atop the fiberglass tape 27, the tube is helically wrapped with a single ply of double thickness fiberglass paper 28. By overlapping the helically wound paper for half its width, the single ply of paper results in a double thickness of thermal insulative fiberglass paper being applied to the tube.

Atop the fiberglass paper 28, the tube is helically wound with three electrical leads 29, 30, and 31. These leads 29, 30 and 31 are insulated leads which are electrically connected at one end to an electrical connector block 32 of the gun 15 and at the opposite end to an electrical connector 33 which is adapted to be connected to the control panel of the melter unit (not shown).

Atop the wrapping of the electrical leads 29–31, the tube is wrapped with two more plies of double thickness fiberglass paper 34*a*, 34*b*. Again, in order to obtain the double thickness, each ply is fifty percent overlapped upon itself for the full length of the helical winding of each ply.

Atop the two plies of fiberglass paper 34, the tube is wrapped for its full length with two plies or wraps of helically wound polyester felt 35*a*, 35*b*. This double thickness of polyester felt (35*a* and 35*b*) is then followed with a single thickness of helically wound vinyl electrical tape 36 which has adhesive upon its underside. This vinyl tape functions as a moisture barrier over the felt.

The electrical leads 29, 30 and 31 to the dispensing gun, as well as the electrical leads to the heater tapes 23, 24 and to the RTD 26, are all bundled together and extend radially from the melter unit end of the hose. This bundle 42, is contained within a braided fiberglass sleeve 49 and a thermoplastic elastomeric tube 50.

The heated hose heretofore described is known in the prior art and is more completely described in U.S. Pat. No. 4,455,474 of Calvin R. Jameson, et al. assigned to the assignee of this application. According to the disclosure of this patent and in prior art practice, the full length of the hose 10 is contained within a braided polyester cover having holes through which the bundled electrical leads 42 extend radially from the hose. According to the practice of this invention, the braided polyester cover is replaced by corrugated plastic tubing 52 having holes 56 through which the bundled electrical leads extend radially from the hose. While in the preferred embodiment the braided polyester cover has been eliminated by the practice of this invention, that braided polyester cover could be retained and utilized in addition to the corrugated plastic tubing 52.

Conventional metal bands 57 are clamped over the ends of the hose so as to secure the insulative materials in compression within the band.

Two molded plastic cuffs 60, 61 are attached to opposite ends of the hose so as to secure the ends of the hose, as well as to enable the ends of the hose to be attached to the gun 15 and to a melter unit (not shown) source of molten thermoplastic material.

The two cuffs 60, 61 are similar in overall construction, the differences being that cuff 60 is substantially longer than the other cuff 61 and the shorter cuff 61 has a slot for the egress of lead bundle 42. Each cuff is made from two plastic molded halves secured together by screws 67. In the drawing, the cuff 60 at the gun end is oriented to illustrate the screws 67 for securing the cuff halves together, while the other cuff 61 is rotated 90° to illustrate the bundle egress hole 62 in the side of the cuff 61. The two cuffs, to the extent that they are identical, have been given identical numerals to designate substantially identical components of the cuffs.

Each cuff 60, 61 comprises two substantially identical halves 60*a*, (60*b* not shown) and 61*a*, 61*b*. The halves differ, other than in length, only in that one half 61*a* is provided with the angulated hole or slot 62 through which the bundle 42 of electrical leads extend. Each half comprises a semi-circular tubular section 64 having one partially closed end 65. The end 65 has a semicircular hole 66 in the center such that when the two halves are put together, the semicircular holes 66 combine to form a circular hole through the otherwise closed end of the cuff. The two halves of the cuffs are secured together by the screws 67 which extend through matching holes 68 formed in each half of the cuff.

Formed on the interior of the end walls 65 of each half of the cuff 61, there is preferably a Y-shaped groove 69. When the cuff 61 is assembled over the end of the hose, this Y-shaped groove mates with flats 70 formed on the hexagonal portion 71 of the swivel fitting 13 so as to prevent the cuff from rotating relative to the hose 10.

It will be seen that the bundle of electrical leads 42 at the melter unit end of the hose extends through the hole or slot 62 in the half 61*a* of the cuff 61. The outer end of the tube 49 containing the bundle of electrical leads extends into a conventional commercially available electrical connector plug 33. This plug has multiple pins adapted to be received within pins of the control section of the melter unit so as to electrically connect the leads of the hose to the electrical leads of the control unit.

On the gun end of the hose 10, the cuff 60 is mounted to a heat transmitting metal pivot sleeve 72. The pivot sleeve is fixedly secured to the heated flex hose 10 through which molten adhesive and electrical power is supplied to the gun 15.

Each cuff 60, 61 has three internal annular ribs 75, 76, 77 which are adapted to be received within annular recesses of the corrugated hose 52. When these ribs are secured within the recesses of the corrugated tubing, the ribs function to lock the tubing within the interior of the cuffs.

The corrugated tubing 52 is a conventional, commercially available product. One such suitable corrugated tubing product is manufactured by Kellums division of Harvey Hubbell of Stonington, Conn., U.S.A. The corrugated tubing manufactured by this company is made from a rigid polyvinyl-chloride skeleton fused to a flexible polyvinyl-chloride skin. Another suitable corrugated tubing product usable in the practice of this invention is manufactured by O.E.M. Corporation of Aurora, Ohio.

The addition of the corrugated tubing to the heated hose and the attachment of the ends of the tube 52 to the interior of the cuffs 60, 61 by securement of the annular ribs 75, 76 and 77 on the interior of the cuffs within recesses on the exterior of the corrugated tubing has the effect of preventing the hose from kinking and breaking at the interface between the hose and the cuff. Such kinking and breaking of the hose has heretofore been a common problem at the point at which the end 78 of the cuffs intersect or engage the periphery of the covering material on the hose. At that point there has been a tendency for heated hoses to break during the course of manipulation of the gun 15 by the operator. The addition of the corrugated hose 52 and its connection to the interior of the cuffs 60, 61 has been found to eliminate this breakage problem. The invention of this application has also been found to improve the durability of the hose, as well as to protect it against damage by sharp objects. The tubing 52 also functions as a moisture barrier for the hose.

While I have described only a single preferred embodiment of my invention, persons skilled in the art to which it pertains will appreciate changes and modifications which may be made without departing from the spirit of my invention. Therefore, I do not intend to be limited except by the scope of the following appended claims:

Having described my invention, I claim:

1. A flexible heated hose of substantially uniform construction throughout its length for transmitting hot liquid material comprising a flexible polymeric tube contained within a braided metal covering, said tube having hydraulic fittings sealingly attached to opposite ends of the tube, multiple plies of heat and electrical insulative material helically wrapped around said braided covering, at least one electrical heating line helically wrapped around and embedded within said multiple plies of heat and electrically insulative material, electrical leads for supplying electrical power to said at least one electrical heating line, a pair of molded plastic cuffs, one of said cuffs being secured over each end of said hose, means for preventing the hose from being kinked and broken at the intersection of the hose cuff with the hose when subjected to a severe bending force of sharp radii at that location, said prevention means comprising, an exterior ply of polymeric corrugated tubing surrounding said hose, said corrugated tubing having annular ribs separated by annular recesses on the periphery thereof, and each of said hose cuffs having at least one inwardly extending annular rib formed on the interior surface thereof and engaged with an annular recess formed on the periphery of said corrugated tubing of said hose to secure said cuff to said corrugated tubing.

2. The hose of claim 1 wherein said polymeric tube, said multiple plies of heat and electrical insulative materials and electrical heating line extend into said cuffs beyond the ends of said corrugated tubing.

3. The hose of claim 2 wherein each of said cuffs has a side wall and an end wall, said hydraulic fittings extending through said end wall of said cuffs and said electrical leads extending through a side wall of at least one of said cuffs.

* * * * *